(12) United States Patent
Gizara

(10) Patent No.: US 7,088,012 B2
(45) Date of Patent: Aug. 8, 2006

(54) TRANSVERSE HYDROELECTRIC GENERATOR

(76) Inventor: Andrew Roman Gizara, 24471 Corta Cresta Dr., Lake Forest, CA (US) 92630-3914

( * ) Notice: Subject to any disclaimer, the term of this patent is extended or adjusted under 35 U.S.C. 154(b) by 3 days.

(21) Appl. No.: 10/905,195

(22) Filed: Dec. 21, 2004

(65) Prior Publication Data

US 2006/0131890 A1    Jun. 22, 2006

(51) Int. Cl.
*F03B 7/00* (2006.01)
(52) U.S. Cl. .................................................... 290/43
(58) Field of Classification Search .................. None
See application file for complete search history.

(56) References Cited

U.S. PATENT DOCUMENTS

| | | | | |
|---|---|---|---|---|
| 2,717,352 A | * | 9/1955 | Ribner | 322/36 |
| 3,604,942 A | * | 9/1971 | Nelson | 290/54 |
| 4,142,832 A | * | 3/1979 | Clifton | 416/117 |
| 4,613,760 A | * | 9/1986 | Law | 290/1 C |
| 4,994,684 A | * | 2/1991 | Lauw et al. | 290/52 |
| 5,083,899 A | * | 1/1992 | Koch | 415/2.1 |
| 5,476,293 A | * | 12/1995 | Yang | 290/4 C |
| 5,512,787 A | * | 4/1996 | Dederick | 290/4 R |
| 6,037,749 A | * | 3/2000 | Parsonage | 320/132 |
| 6,104,097 A | * | 8/2000 | Lehoczky | 290/54 |
| 6,608,397 B1 | * | 8/2003 | Makino et al. | 290/44 |
| 6,670,721 B1 | * | 12/2003 | Lof et al. | 290/44 |
| 6,674,263 B1 | * | 1/2004 | Agbossou et al. | 320/101 |
| 6,682,302 B1 | * | 1/2004 | Noble | 416/1 |
| 6,841,893 B1 | * | 1/2005 | Maiwald et al. | 290/43 |
| 6,954,004 B1 | * | 10/2005 | Skeist et al. | 290/44 |

* cited by examiner

Primary Examiner—Joseph Waks

(57) ABSTRACT

A power plant extracts energy from a free flowing motive fluid by means of a transverse mounted generator with its rotor extending downward into the flow. Runner blades with hinges attain the greatest surface area when the flow is tangent to and in the same direction as the rotor rotation. The hinges fold the runner blades to minimize the surface area proportional to drag when the blades oppose the flow. The generator with feedback control charges batteries, produces hydrogen fuel by electrolysis of water, or further couples to a DC motor coupled to an AC generator. Other features optionally perform such tasks as adaptively locating the generator in the maximum velocity flow, controlling and communicating the state of charge of the battery, or gauging and controlling the electrolysis process and communicating the fullness of the hydrogen gas output tanks.

17 Claims, 7 Drawing Sheets

TRANSVERSE HYDROELECTRIC GENERATOR

BACKGROUND OF INVENTION

1. Field of the Invention

The present invention is generally in the field of power plants. More specifically, the present invention is in the field of hydrokinetic generators with means to adapt to changes in streamline direction and magnitude of a free flowing motive fluid.

2. Description of Prior Art

For over two thousand years mankind has known of harnessing the kinetic energy in flowing water to perform mechanical endeavors. In the past two hundred years the pace in which developments emerged in the practice of hydraulics has accelerated. The advent of the turbine in the first half of the nineteenth century culminated in the present advancements in hydroelectric generation, with this period of innovation and intense interest peaking in the first quarter of the twentieth century. Since then, fossil fuels have dominated as the high net energy, readily available energy source in the production of electricity and other conveyors of power. With known fossil fuel reserves at what presently appears to be arguably half depleted, as well as the environmental impact of using a polluting energy source, there is a strong need to develop a renewable and sustainable source of energy to support humankind.

Presently the hydroelectric power plant industry earns revenues of approximately thirty billion dollars annually, but unfortunately is in a state of decline mainly due to the environmental and civic costs of implementing the existing technology. Environmental impact of the prior art hydroelectric power plant threatens extinction to aquatic species living downstream from the proposed power plant infrastructure, and also displaces all human inhabitants that live in what would become the flood plane of the infrastructure. It is estimated that over sixty million people have been displaced in the past century due to hydraulic power plant development with no mention of the number of species of plant and animal that have gone extinct. Furthermore, given the prior art technology, there still exists the possibility of life threatening flooding occurring downstream from the site of the hydraulic power plant infrastructure. Overall these costs have weighed heavily in civic planners' decisions in adopting hydroelectric power generation to the point of putting the industry in a state of such decline that leading companies involved in this business are contemplating other areas of endeavor.

Inherent problems in the prior implementation of hydroelectric power generation have exacerbated the present state of declining interest in this technology. The earliest implementation of hydrokinetic systems, commonly known as waterwheels, allowed less impact to the natural flow of the body of water from which these systems drew energy. With the greater efficiency gained by enclosing the impeller within the turbine came the need for more sophisticated penstock arrangements, which included greater infrastructure in the form of dams incurring the majority of the civil and environmental costs. The penstock, gate and impeller arrangements for these systems are physically coupled to sustain a given range of flow velocities and pressures over varying head and load so to maintain required synchronization to the end electrical alternating current output. This requirement imposes on these systems almost exclusive implementation in freshwater systems with large scale infrastructure, increasing impingement on human habitats, and for the most part, neglecting the significant kinetic energy recoverable from one or more of various forms of oceanic flow.

Other prior art exists where the motive fluid is ocean water, but still requires significant infrastructure. In one form, dam like structures known as barrages compel tidal flow to affect a turbine. Some turbines exist that operate in free flow, but do not adapt to changes in direction and have limited capacity, typically less than a kilowatt. In another recently developed form, offshore platform structures behave as pistons on waves at medium depths, in turn pumping a motive fluid through a turbine and then requiring a long distance power cable generally carrying high voltage direct current back to shore, to be further processed. This likely incurs significant maintenance costs for the offshore platforms. Fully implementing this prior technology would likely impede shipping lanes as a farm of these platforms effectively fences the shoreline. This stands as one of several known environmental impacts of this prior technology with others hypothetically existing.

When one amortizes the total amount of energy that goes into building and maintaining a prior art hydroelectric power installation, it becomes obvious that it takes a considerable amount of time before the plant becomes net energy positive, or in other words, the point when the total investment of energy compared to the total recovery of energy is at the breakeven point. As a further example, fossil fuel, not being a renewable resource, requires mining or drilling deeper and pumping farther to obtain a lower yield and lower quality of fuel incurring more costly refining to recover the remaining reserves at the end-of-life of a mine or a well. Thus, fossil fuel as an energy source clearly diminishes in net energy as time goes on, until it obviously becomes a sink, no longer a source. This latter example reinforces the inevitability of mankind's undeniable need for a sustainable and renewable source of energy. Contemplating the net energy curves of a renewable energy source and fossil fuel indicates a sense of urgency for the development of a renewable source. The timing of the crossover point of when one source becomes net energy positive as the other becomes net energy negative will dictate the severity of the ensuing energy crisis and thus the impact on humanity. As time goes on it will be less likely an option to expend a great deal of energy as an investment while more mundane needs are no longer being met. Despite this sense of urgency in the need to develop renewable, sustainable sources of energy, as previously stated hydroelectric power plant development is actually declining.

Therefore, there exists a fundamental need for developing renewable and sustainable sources of energy including further exploitation of readily available known resources. More specifically, there exists a need for a novel approach to ensure low impact to environment and low civic infrastructure costs such that the energy investment return is most quickly realized. Utmost, to optimally exploit oceanic energy, such as that which arrives onshore, adaptability to inherently unsteady flow is prerequisite of any such system. A system that can achieve the above-specified goals would readily attain a relatively high net energy soon after its inception.

SUMMARY OF INVENTION

The present invention achieves the goals of overcoming existing limitations of present day hydroelectric power generation systems by foremost having the ability to extract power from a free flowing fluid. While prior art exists which functions in free flowing bodies of water, the novelty of this invention lies in its ability to respond and adapt to any change in the magnitude and direction of the streamlines of the free flowing motive fluid. This enables this invention to extract energy from breaking ocean waves, presently an untapped but readily available known source of energy.

Secondly, because adapting to change of both magnitude and direction of the streamlines of a free flowing motive fluid formed the basis of the guiding concepts of the present invention; this also avails the present invention the applicability to other bodies of water besides the ocean. Having been conceived for free flowing motive fluid use obviates the prior art's inherent need for large-scale infrastructure and thus eliminates two fundamental disadvantages presently challenging the hydroelectric power industry. The present invention does not require this scale of infrastructure and therefore greatly diminishes the environmental impact while attaining a positive net energy earlier upon implementation.

Overcoming the conceptual need for synchronization to the electric power grid positions the present invention as desirable for implementation in gathering energy for the emerging power conveyance systems, especially hydrogen fuel and fuel cell technology.

DETAILED DESCRIPTION

The present invention is directed to a transverse hydroelectric generator comprising hinged runner blades for adaptively extracting energy from a free flowing motive fluid that continuously changes direction and magnitude of flow. The following description contains specific information pertaining to various embodiments and implementations of the present invention. One skilled in the art will recognize that the present invention may be implemented in a manner different from that specifically depicted in the present specification. Furthermore, some of the specific details of the invention are not described in order to maintain brevity and to not obscure the invention. The specific details not described in the present specification are within the knowledge of a person of ordinary skills in the art. Obviously, some features of the present invention may be omitted or only partially implemented and remain well within the scope and spirit of the present invention.

The following drawings and their accompanying detailed description are directed as merely exemplary embodiments of the invention. To maintain brevity, some other embodiments of the invention that use the principles of the present invention are specifically described but are not specifically illustrated by the present drawings, and are not meant to exhaustively depict all possible embodiments within the scope and spirit of the present invention.

Figure 1:
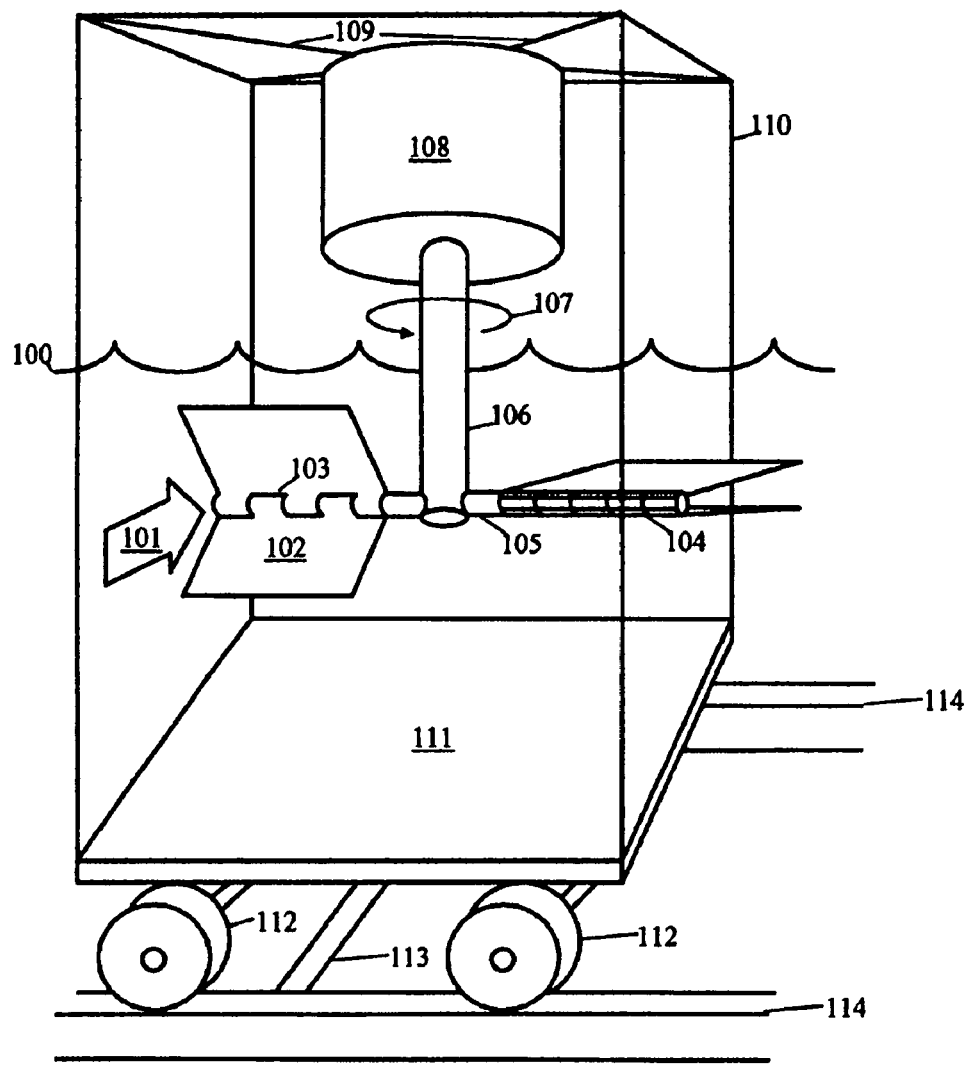
FIG. 1 illustrates a general perspective view of an exemplary apparatus in accordance with a preferred embodiment of the present invention.

FIG. 1 illustrates a general perspective view of an exemplary apparatus in accordance with one embodiment of the present invention. Arrow 101 indicates direction of the approaching flow of the free flowing motive fluid 100, impinging upon one of a plurality of runner blades 102 of the impeller of the hydroelectric generator shown covered with a chassis 108. The plurality of runner blades 102 couple to the generator rotor 106 through corresponding beams 105 orthogonal to the axis of the generator rotor 106. The orthogonal beams 105 and corresponding runner blades 102 are shown in FIG. 1, FIG. 2, FIG. 3, and FIG. 4, though the drawings are not necessarily to scale of the preferred embodiment. The length of the orthogonal beam 105 and dimensions of corresponding runner blades 102 shown throughout the drawing figures obviously determine the torque delivered to the rotor 106 and force extractable from a motive fluid of given pressure, respectively. These design parameters present a means of scalability by design to adjust the power output from the generator. The orthogonal beam 105 primarily serves the purpose of mechanical clearance, i.e. preventing the runner blades 102, in their open 103 and closed 104 positions from obstructing one another, whereby field excitation control in the generator may compensate for increased torque brought about by the lengthened orthogonal beams 105 which inherently do not increase power output themselves. Further elaboration on the scalability and regulation of the output power will follow in subsequent paragraphs describing FIG. 14. Next, this specification will immediately address the operating positions of the runner blades 102, illustrated in FIG. 1, FIG. 2, FIG. 3 and FIG. 4, in open 103, and closed 104 positions attached to their corresponding orthogonal beams 105.

A fundamental and significant departure from prior art that provides considerable novelty in this invention is the implementation of the hinged runner blades 102, shown in FIG. 1, FIG. 2, FIG. 3, and FIG. 4 in both open 103 and closed 104 positions. The rotor direction 107 of rotation remains constant regardless of the direction 101 of flow of the free flowing motive fluid 100 strictly due to the orientation of the hinge of the hinged runner blade 102 with respect to its corresponding orthogonal beam 105. As seen best from the bottom view depicted in FIG. 3, because the direction 101 of flow of the free flowing motive fluid 100 causes the hinged runner blade 102 to open 103 as shown, the force imparted upon the face of the runner blade 102 creates torque coupled through the orthogonal beam 105 causing the generator rotor 106 to rotate in the direction 107. Likewise, the force imparted by the free flowing motive fluid 100 causes the hinged runner blade 102 to close 104 when the rotor 106 rotates the runner blade 102 into the direction of flow 101. The runner blade 102 in the closed position 104 clearly occupies less area normal to the direction of flow 101 of the free flowing motive fluid 100, and thus will incur significantly less torque counter to the direction 107 of the generator rotor 106, and therefore the entire impeller will incur significantly less drag. As an example of the ability of the present invention to respond to change in direction of the free flowing motive fluid 100, as the free flowing motive fluid 100 changes direction 101 of its streamlines parallel to the horizontal plane by any arbitrary angle, this change in direction results in the position where the hinged runner blade 102 opens 103 tracking the change of the direction 101 whereby the runner blades 102 continuously open 103 where the orthogonal beam 105 is normal to the new direction of flow 101. Thus the present invention adapts to any change in direction of the streamlines of a free flowing motive fluid. Obviously, any change in type, position or orientation of the hinge of the runner blade 102, or number or length of orthogonal beams 105 employed within the preferred embodiment of the present invention does not constitute a substantial departure beyond the scope of the invention.

Proceeding further with the features depicted in FIG. 1, the chassis 108 of the generator is affixed to horizontal support beams 109, which are affixed to the vertical support struts 110. The support struts 110 are shown in FIG. 1 mounted to the base 111. Under the base is a system of rollers 112 riding on a set of rails 114 driven from under the base 111 through the drive axle 113. Further detail of the drive system will be described in FIG. 11, FIG. 12, FIG. 13, and in subsequent paragraphs. This rail system serves the primary purpose of optimally locating the entire generator system adaptively to an area of flow where maximum energy may be extracted, particularly, preventing the generator chassis 108 from becoming submerged which subjects the entire support structure 109, 110 to undue mechanical stress and reduces the energy extractable from the free flowing motive fluid 100 as the flow becomes turbulent in the vicinity of the submerged chassis 108. Preventing the generator chassis 108 from becoming submerged by design presents another advantage in simplifying the required chassis type to a splash-proof or water-resistant class versus a completely waterproof design. The rail system exists for the secondary purpose of facilitating maintenance on any part of the system at a more convenient location than its in-service location. The rail system serves a third purpose of allowing for moving the generator out of the way of any vessel needing to pass in the present vicinity of the generator. Clearly any deviation from the above stated system, such as a winch and pulley system, which continues to allow the generator system to be adaptively positioned, does not constitute a substantial departure beyond the scope of the present invention. Maximum energy extraction location for the unit has been initially considered the onshore side of breaking ocean waves but can be any area of highest velocity of flow in any body of motive fluid. One alternate example of this includes any body of water that has flow patterns that vary diurnally or seasonally.

Let it be known that the aforementioned features that enable the generator to namely: adapt to any change in the direction of the streamlines of a free flowing motive fluid; or, adaptively position the generator in an optimal flow location using the rail system; while originally conceived for accommodating use in breaking ocean waves, obviously are advantageous for use in other bodies of water such as, but not limited to rivers, creeks, inlets, tidal bores, rapids, or waterfalls. Therefore, use of the present invention in any body of water other than breaking ocean waves does not constitute a substantial departure beyond the scope of the present invention.

Figure 2:
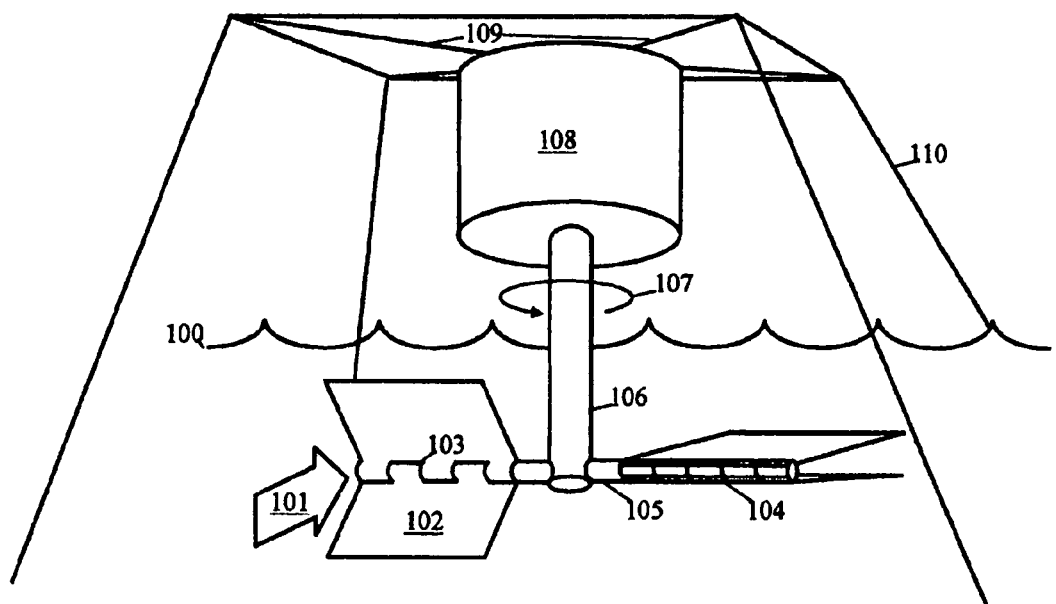
FIG. 2 illustrates a perspective view of an apparatus of simplified mounting in a fixed position relative to the free flowing motive fluid.
Figure 3:
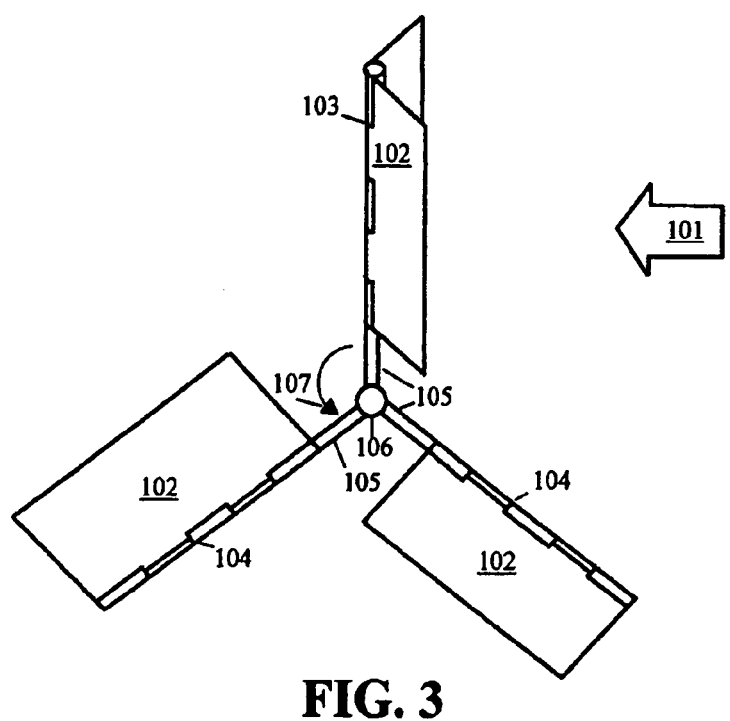
FIG. 3 illustrates a bottom view along the generator rotor in FIG. 1 according to a preferred embodiment of the present invention.

FIG. 2 illustrates a perspective view of an alternate embodiment simplified by comprising a mounting system of fixed position with respect to the free flowing motive fluid 100. The apparatus of FIG. 2 is essentially the same as FIG. 1 with the exception of the omission of the base 111, the rollers 112, the drive axle 113, and the rails 114. As previously stated, the fundamental goal of the present invention is to attain the highest possible net energy, in other words, highest return on investment in terms of energy, through implementing the simplest design. At the time of writing this specification the inventor had yet to determine for the general case whether the cost of replacing the parts of the generator system that may receive mechanical damage during instances of excessively high energy in the free flowing motive fluid is greater or less than the cost of implementing the aforementioned parts of the rail system that prevents said damage. Factors specific to the scale and location of the installation decide between these two configurations. Therefore, FIG. 2 likely very well represents the preferred embodiment of the present invention in the majority of installations.

Figure 4:
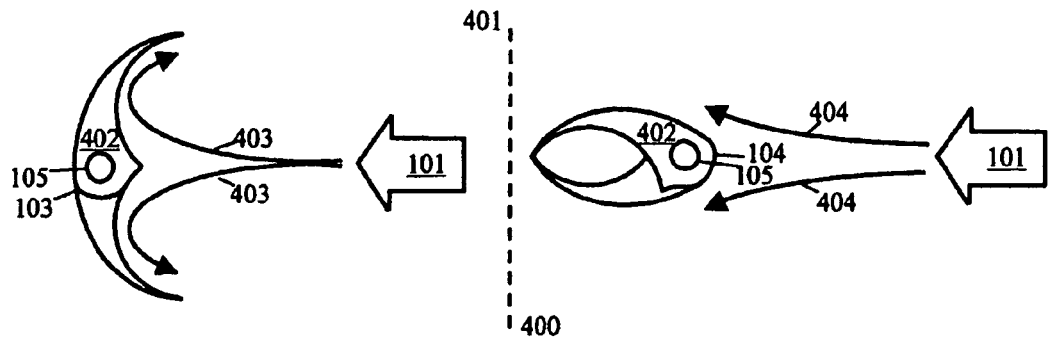
FIG. 4 illustrates a view along the beam orthogonal to the axis of the rotor, cross sections of two positions of the runner blade within the free flowing motive fluid according to an alternate embodiment of the present invention.

This specification now refers to FIG. 4, a view along the orthogonal beam 105, cross sections of two positions of an alternate embodiment of the runner blade. The runner blade 102 previously described differs from the runner blade 402 portrayed in FIG. 4 in that the previous runner blade 102 simply comprises flat sheets bent at the hinges whereas the alternate runner blade 402 is cast in a similar cupped form as that of a Pelton wheel impeller. The dashed line ending in points 400 and 401 indicates two positions of the alternate runner blade 402 such that the position to the left of the dashed line 400–401 occurs when the runner blade 402 is in the open 103 position, and in the view on the right of the dashed line 400–401 the runner blade 402 is closed 104. The direction 101 of the motive fluid is shown breaking off into streamlines 403 to the left of the dashed line 400–401 to impart greater forces, both impulse and reaction, on the runner blade 402 in the open position 103 with the reaction force due to the change of direction of the streamlines 403 by the cupped runner blade 402 compared to only the impulse force exerted on the sheet runner blade 102. To the right of the dashed line 400–401 the direction 101 of the motive fluid is shown breaking into streamlines 404 which pass over the runner blade 402 in the closed 104 position imparting significantly less force to oppose rotor rotation caused by the prime mover, the streamlines 403. Ultimately, the choice of which type of runner blades, whether the flat sheet runner blade 102 versus the cupped cast runner blade 402 once again likely depends on specific conditions of the installation such as scale of power system, i.e. length of the orthogonal beam 105 and the dimensions of corresponding runner blades, and especially water pressure, as the Pelton wheel has traditionally excelled in high head, in other words high pressure applications, and particularly if the return in additional extracted energy pays for the cost of tooling the more sophisticated cast runner blade 402. Another factor in choosing the alternate cast runner blade 402 over the sheet runner blade 102 includes the possibility of cavitation in the motive fluid which results in not only diminished extractable energy but also increased wear on the runner blade, the choice here once again ultimately depending on net energy and cost of replacement differences.

Figure 5:
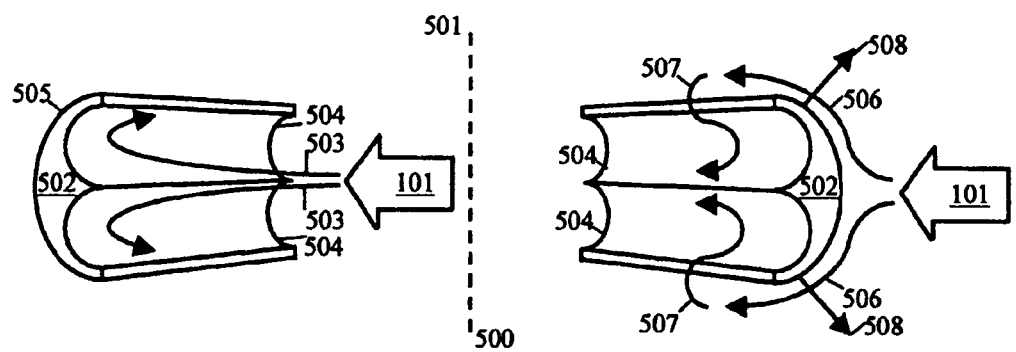
FIG. 5 illustrates a perspective view orthogonal to the axis of the rotor, cross sections of two positions of an alternate impeller within the free flowing motive fluid according to one embodiment of the present invention.

One skilled in the art may recognize the runner blade 402 in this alternate embodiment of the present invention as a hinged variation of the impeller invented by Pelton. FIG. 5 illustrates a more obvious variation of a Pelton impeller affixed to the rotor 106, not shown, inward where inner concave edge reference 504 is shown, the present invention having the fundamental difference of comprising a generator of transverse orientation to a free flowing motive fluid 100 in which the impeller is completely submerged. The simplicity of construction presents one advantage the impeller 502 of FIG. 5 holds over the hinged runner blade 402 impeller of FIG. 4, while maintaining response to impulse and reaction force shown by streamlines 503. The components needed to manufacture this impeller 502 simply include a longitudinal cross section of a pipe of non-corrodible material of large outside radius to form the convex surface 505, conjoined with two likewise longitudinal cross sections of a pipe of non-corrodible material of small inside radius to form the concave surfaces 504. Greater resistance compared to the hinged runner blade 402 when opposing the streamlines 506 of flow 101 as shown to the right of dashed line 500–501 decreases the energy extractable from the impulse and reaction forces, though. The fact that streamlines 506 travel a greater distance than streamlines 507 and therefore have higher relative velocity and thus lowered pressure against their surface to create dynamic lift 508 somewhat mitigates the loss of extractable energy due to opposing the flow 101 shown on the right of dashed line 500–501. As before, the choice of this impeller 502 versus the previously described hinged runner blade impellers depends on specific conditions of the installation such as scale of power system, i.e. length of the orthogonal beam 105 and the dimensions of corresponding runner blades, and particularly if the return in additional extracted energy pays for the cost of tooling and manufacture of the more sophisticated runner blade 402.

Figure 6:
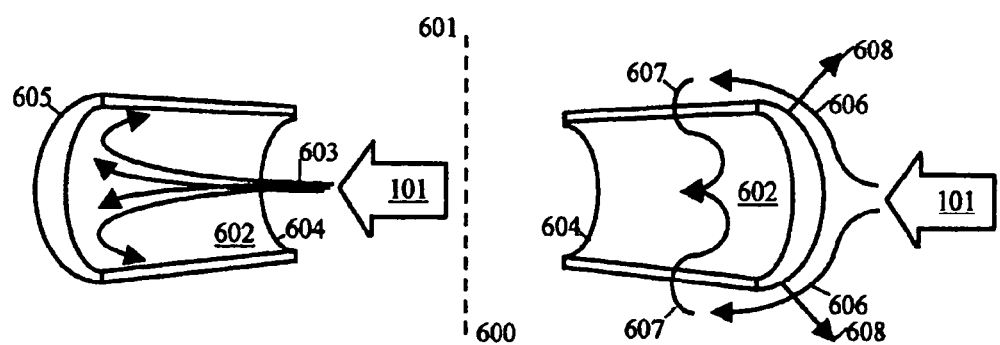
FIG. 6 illustrates a perspective view orthogonal to the axis of the rotor, cross sections of two positions of an alternate impeller within the free flowing motive fluid according to one embodiment of the present invention.
Figure 7:
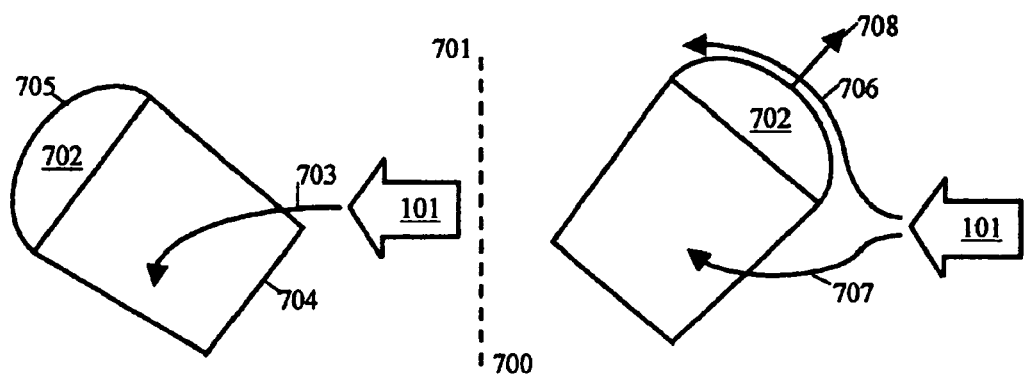
FIG. 7 illustrates a perspective view orthogonal to the axis of the rotor, cross sections of two positions of an alternate impeller within the free flowing motive fluid according to one embodiment of the present invention.
Figure 8:
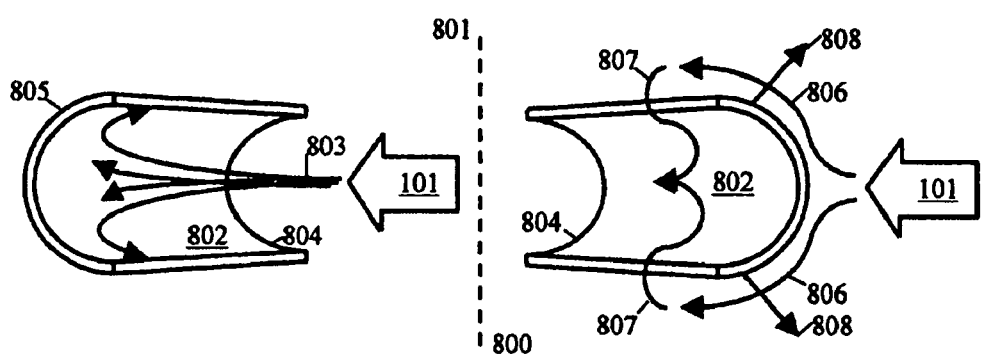
FIG. 8 illustrates a perspective view orthogonal to the axis of the rotor, cross sections of two positions of an alternate impeller within the free flowing motive fluid according to one embodiment of the present invention.

FIG. 6, FIG. 7, and FIG. 8 illustrate perspective cross sections of progressively simpler impeller constructions abandoning the design principals of mitigating drag forces opposing the prime mover by means of hinged runner blades, and extracting energy from reaction force by similar means as the Pelton impeller, in favor of minimal initial investment. The components required to manufacture the impeller 602 of FIG. 6 simply include two concentric longitudinal cross sections of a pipe of non-corrodible material such that the pipe forming the convex surface 605 is of smaller radius than the pipe forming the concave surface 604. Like the impeller 502 of FIG. 5, the design of impeller 602 to the right of dashed line 600–601 of FIG. 6 attempts to take advantage of dynamic lift by virtue of the streamlines 606 traveling a relatively longer distance than streamlines 607 and therefore having a higher relative velocity and thus lower pressure to provide some dynamic lift 608 on the convex surface 605 when the impeller 602 opposes the direction 101 of flow, although cavitation in the vicinity of concave surface 604 is more likely with this simpler construction in this position. Streamlines 603 on the left of the dashed line 600–601 depict the position of the impeller 602 responding to the prime mover, mostly impulse force impinging upon the concave surface 604, with significantly less reaction force.

Like FIG. 6, FIG. 7 also depicts a two-piece construction; only in FIG. 7 a flat surface 704 replaces the concave surface 604 of FIG. 6. There still exists a convex surface 705 which a longitudinal cross section of a pipe of non-corrodible material constitutes. As shown to the right of dashed line 700–701, while the flat surface 704 of the impeller 702 allows for a minimal distance for the streamline 707 to travel implying streamline 706 has a relatively greater distance compared to similar streamlines in previously described impellers, thus facing into the direction 101 of flow creates the greatest dynamic lift 708 for this impeller 702. Conversely, to the left of the dashed line 700–701, as depicted the streamline 703 impinges upon the flat surface 704 providing only limited impulse force extracted from the prime mover. At the time of writing this specification, the inventor has not determined under what conditions this impeller 702 provides an optimal balance between the design parameters of power scale, motive fluid pressure, cavitation, impulse force plus dynamic lift versus prime mover resistance combined for a plurality of runners 702 simultaneously, and the cost of implementation versus net energy extracted. Therefore this impeller 702 style is merely illustrative of a possible embodiment within the scope of this invention, though likely less optimal than the aforementioned preferred embodiments because of its abandoning the principals of mitigation of prime mover resistance by means of a hinge and extraction of energy from reaction force.

FIG. 8 illustrates the simplest construction of an impeller manufactured from a single piece longitudinal cross section of a pipe of non-corrodible material. To the left of dashed line 800–801 the direction 101 of the prime mover is shown breaking into streamlines 803 as it impinges the concave surface 804 of the impeller 802. To the right of dashed line 800–801, the impeller 802 in this position opposes the direction 101 of the prime mover breaking into streamlines 806 and 807. Streamlines 806 appear to be marginally longer than streamlines 807 depending on thickness of the pipe used to construct the impeller 802. So in theory while some dynamic lift 808 exists at the convex surface 805 in the position to the right of dashed line 800–801, it is likely of significantly less magnitude and cavitation is most likely to occur in the vicinity of the concave surface 804 than in previously described impeller embodiments. As in the previously described embodiment of impeller 702, the impeller 802 is merely illustrative of a possible embodiment within the scope of this invention, though likely less optimal than the aforementioned preferred embodiments because of its abandoning the principals of mitigation of prime mover resistance by means of a hinge and extraction of energy from reaction force.

Figure 9:
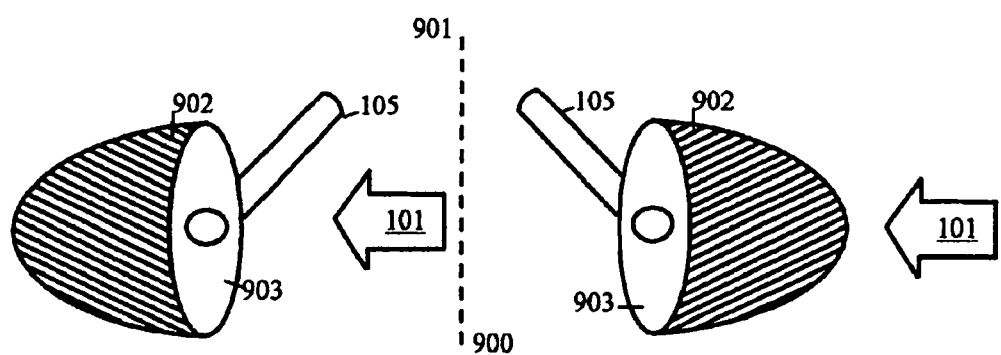
FIG. 9 illustrates a perspective view orthogonal to the axis of the rotor, two positions of an alternate impeller within the free flowing motive fluid according to one embodiment of the present invention.

One skilled in the art may recognize the impeller 902 in FIG. 9 as common to the typical weather vane. In view of the invention of the weather vane this hydrokinetic impeller represents little significant novelty alone, but considering the subsequent description of the scalability of power and adaptive control for changes in dynamic energy of the motive fluid, illustrates other novel features of the present invention, and can serve this discussion to elicit the advantages of the hinged runner blade impeller previously described, and introduce the impeller of FIG. 10. On the left side of dashed line 900–901 in FIG. 9, the impeller is shown mounted on the end of the orthogonal beam 105 with the internal surface 903 facing the direction 101 of flow. On the right side of dashed line 900–901, the ellipsoidal exterior surface 902 is shown opposing the direction 101 of flow. For the impeller 902, the orthogonal beams 105 once again only provide mechanical clearance from one ellipsoidal exterior surface 902 to the next, as the additional moment arm does not enhance power output, but increases torque on the rotor. Furthermore, under conditions of high energy within the motive fluid, the orthogonal beams 105 for the impeller 902 of FIG. 9 have a higher probability of mechanical fatigue than the orthogonal beams 105 of the hinged runner blades 102 or 402 of the preferred embodiments because the preferred embodiments implement the hinge which mitigates the resistive force, in other words drag, opposing the prime mover, which impinges upon the ellipsoidal exterior surface 905 as shown to the right of dashed line 900–901 in FIG. 9. Although the preferred embodiment comprises moving parts, the embodiment of FIG. 9 likely has relatively less reliability due to the fatigue caused by drag during instances of high energy within the motive fluid. Nonetheless, given the feedback control of field excitation subsequently described with FIG. 14, the present invention sustains effective generator operation within an extended dynamic energy range in the motive fluid while implementing even the most obvious impeller of FIG. 9, and therefore displays novelty even in this embodiment. As the impeller 902 is cast, and obviously costs more than the sheet runner blade 102, the impeller 902 necessarily needs to extract energy at a rate greater than the cupped cast runner blade 402 to justify the additional tooling and manufacturing cost along with factoring compromised reliability.

Figure 10:
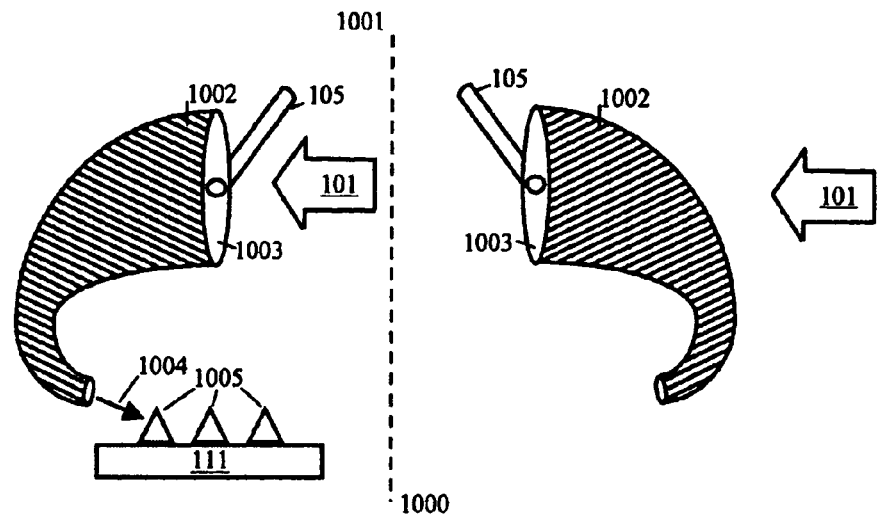
FIG. 10 illustrates a perspective view orthogonal to the axis of the rotor, two positions of an alternate impeller within the free flowing motive fluid according to one embodiment of the present invention.

FIG. 10 presents an adaptation derived from the impeller 902 of FIG. 9 enabling higher performance as a hydrokinetic impeller. As before in FIG. 9, on the left side of dashed line 1000–1001, FIG. 10 depicts a cast impeller mounted at the end of the orthogonal beams 105 with the interior surface 1003 facing the direction 101 of flow. The external surface 1002 differs from the previous external surface 902 in that the impeller with external surface 1002 has a curvature to change both direction and magnitude of the velocity of flow as it impinges the internal surface 1003. The arrow 1004 depicts this change of magnitude and direction of the velocity of the flow as it exits the interior surface 1003 of the impeller. These changes in velocity of the flow serve the purpose of providing a reaction force in addition to the impulse force on the impeller. The output flow 1004, at a greater velocity than the prime mover 101 since the area at the exit is less than the area at the entrance, further impinges the barrages 1005, a cross sectional view in FIG. 10, mounted on the base 111 in a circular trajectory with the barrage surfaces always normal to the output flow 1004. These barrages 1005 form a high-density medium onto which the output flow 1004 impinges thus increasing the thrust transferred to the impeller. To the right of dashed line 1000–1001, the additional curvature on the exterior surface 1002 compared to the exterior surface 902 of FIG. 9 incurs negligible additional area to oppose the flow 101, therefore this attribute renders this adaptation upon the impeller of FIG. 9 relatively beneficial. As with the previous impeller 902, since this impeller 1002 is cast, and obviously costs more than the sheet runner blade 102, the impeller 1002 necessarily needs to extract energy at a rate greater than the cupped cast runner blade 402 to justify the additional tooling and manufacturing cost along with factoring compromised reliability.

Let it hereafter be known that implementation of runner blades, whether or not responsive to impulse and reaction forces or which may or may not mitigate resistive force when rotating within the motive fluid, which do respond to changes in direction and magnitude of the streamlines of a free flowing motive fluid in any manner similar to that of the present invention does not constitute a substantial departure beyond the scope of the present invention. In light of the aforementioned, the modification of Pelton runner blades in the preferred embodiment is purely exemplary, illustrative and not restrictive. Furthermore, it may be advantageous to implement the present invention with an impeller of recent advent which claims of being bladeless, as it is well known that seawater is particularly corrosive to metals, breaking waves notably high in particulates, and thus a bladed runner highly susceptible to pitting on the blades and perhaps costly in terms of maintenance. Thus, regardless of the size or shape of the impeller with hinged runner blades or bladeless, an implementation of any such transverse-mounted hydro-electric generator that responds to changes in direction and magnitude of the streamlines of a free flowing motive fluid in any manner similar to that of the present invention does not constitute a substantial departure beyond the scope of the present invention.

Figure 11:
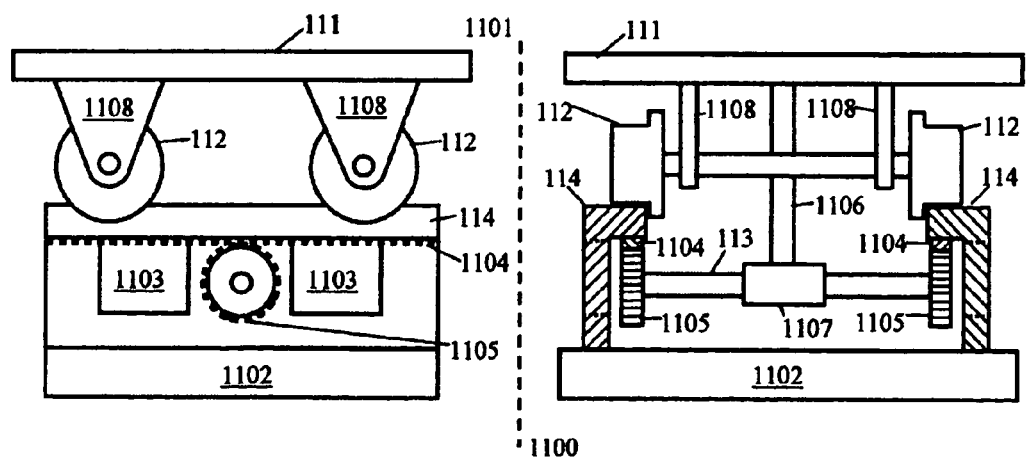
FIG. 11 illustrates the mounting system affixed to a rail system in accordance to the preferred embodiment.

FIG. 11 details the base 111 and associated mechanical components below it. The broken line defined by points 1100 and 1101 indicate alternate views. The left side of the broken line 1100–1101 views from underneath the center of the base 111 looking outward orthogonal to the rails, while the right hand side of the broken line 1100–1101 views underneath the base 111 from a distance parallel to and in between the rails 114. The base 111 rests on the supports 1108 coupled to the axle of the rollers 112. The rollers 112 rotate freely on the rails 114. The rails 114 are secured to a foundation 1102. In the preferred embodiment, this foundation 1102 is formed reinforced concrete, though it alternatively consists of the local natural rock formation depending upon where the application of this invention occurs. Ideally this foundation 1102 is located on the tip of a headland formation where wave energy is most focused, and is sloped of adequate angle with respect to the true horizon so to elicit breaking waves of the plunging or surging type that transfer wave energy into particle velocity in a most concentrated location and succinct time frame. The rails 114 have cutouts 1103 that permit cross flow and thus prevent sand from drifting to the point of obstructing the movement of the drive gears 1105 that meshes with the rail rack gear 1104. When stationary, the drive gears 1105 lock indirectly by coupling through its axle 113 to an internal drive gear not shown locked by a means such as the subsequently described bi-directional anti-backlash and position-locking mechanism to hold the drive gears 1105 steady in the path along the rail which also create tension to hold the system upright against any lateral tilting force. In the preferred embodiment, the means of driving the gears, most easily implemented as a DC stepper motor, will likely occupy the gearbox 1107 or perhaps a compartment not shown under the base 111. The rotor shaft of this motor therefore occupies a location concentric to the drive shaft housing 1106 and has a bevel gear not shown on its end occupying the gearbox 1107. Said bevel gear meshes with the internal drive gear, not shown inside the gearbox 1107, but parallel to the gears 1105 and mounted such that it directly drives the axle 113. The bi-directional anti-backlash and position locking mechanism not shown also occupies the gearbox 1107 and mates and locks the internal drive gear not shown inside the gearbox 1107. A detailed discussion of exemplary sensor input means and the control algorithm itself for the above rail system follows in subsequent paragraphs describing FIG. 15.

Figure 12:
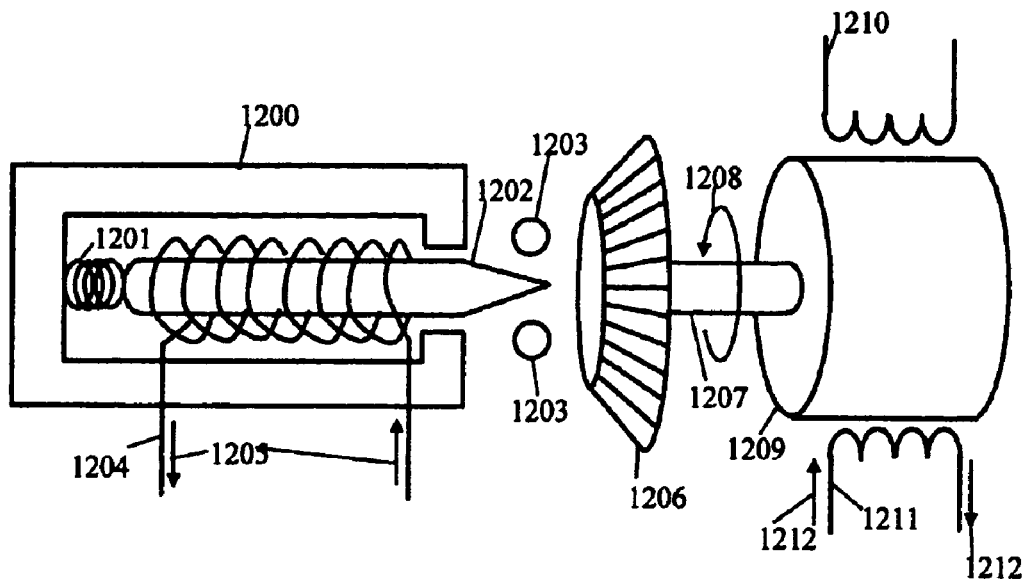
FIG. 12 illustrates the preferred means of bidirectional anti-backlash and position locking mechanism for the bevel drive gear within the gearbox in FIG. 11.

In more detail, the components of FIG. 12 include the rotor, the bevel gear, and the components previously introduced in FIG. 11 and the foregoing paragraph, with the addition of a solenoid 1200 with a plunger 1202 that engages between the teeth of the internal drive bevel gear 1206 to stop motion in the actuated members. FIG. 12 omits the actuated members for sake of clarity though one may presume the actuated members such as the drive gears 1105 are situated as depicted in FIG. 11. The mounting of the solenoid core 1200 and the stops 1203 cast or forged on the inner surface of the gearbox 1107, or perhaps a compartment not shown under the base 111 contains the torque translated back to the plunger 1202 from the actuated members. The solenoid core 1200 is shown spring loaded, with the solenoid spring 1201 compressed by the retracted plunger 1202 when the solenoid coil 1204 has current flowing as depicted by arrows 1205, in accordance to the right-hand rule. The physical positioning of the solenoid 1200 core and the DC stepper motor 1209 and its shaft 1207 is displayed in a collinear orientation to attest the importance of mounting these components concentric to the drive shaft housing 1106 in such a manner as to not disrupt the balance necessary, otherwise mechanical oscillation may occur thereby harming the system efficiency and possibly causing fatigue and shortened life of various components.

Several fundamental advantages arise from employing a DC stepper motor 1209, in actuating motion to traverse the rail system 114. The stepper motor is inherently a precise means of translating rotational displacement and therefore requires no feedback, or in other words may be implemented in an open-loop configuration affording more circuit complexity devoted to higher-level control of the system. Secondly, given the preferred means of bi-directional anti-backlash and position locking mechanism for the bevel gear 1206 as illustrated in FIG. 12, the stator coils 1210, 1211 of the DC stepper motor need powering only in the instances of performing an adjustment, serving to improve the overall efficiency of the generator. Also, because this adjustment period comprises an exceedingly short duty cycle, in the order of one to five percent in the most transitory installations, the current for the stator coils 1210, 1211 is limited by the breakdown voltage of the coil winding insulation, not the thermal wear of the coil itself, as the average power dissipated by its resistive losses are averaged over a much longer period than its duty period. With the use of higher energizing currents, depicted by arrows 1212, comes the advantage of greater torque deliverable to the actuated members in a more space efficient sized DC stepper motor.

Figure 13:
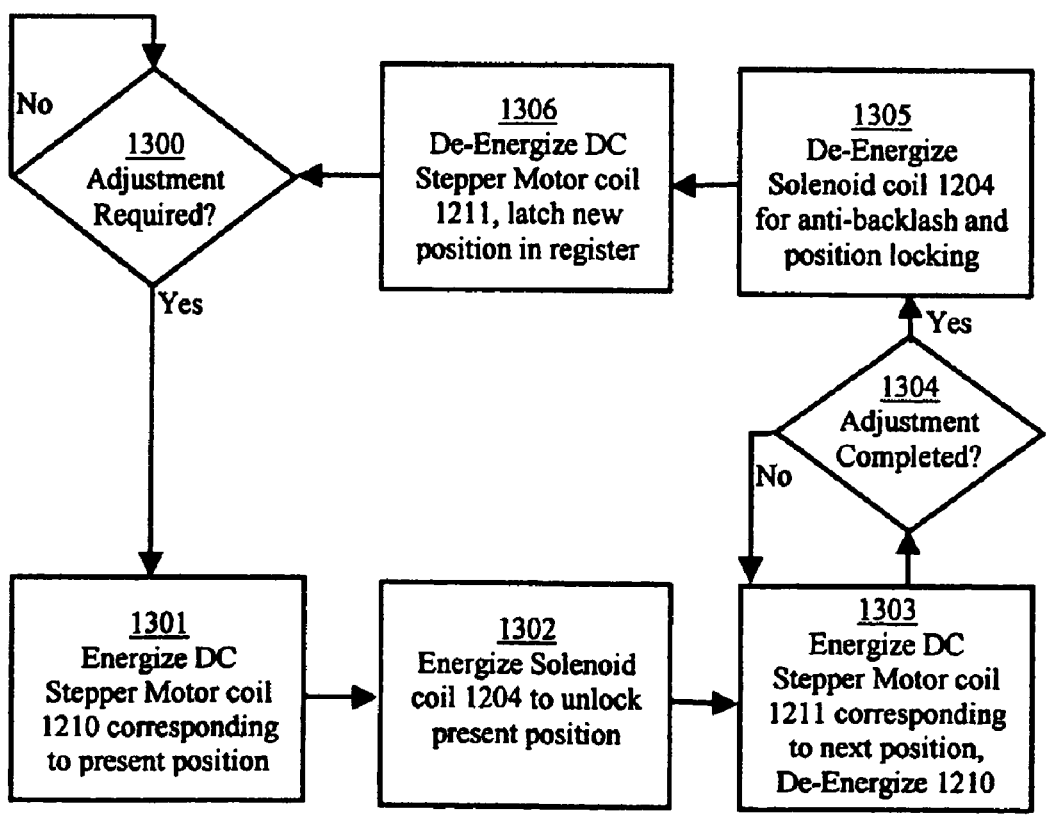
FIG. 13 illustrates the flowchart for synchronizing the bi-directional anti-backlash and position locking solenoid to the motor, both in FIG. 12.

FIG. 13 illustrates the flowchart for synchronizing the bi-directional anti-backlash and position locking mechanism to the bevel gear mechanism of FIG. 12. From the start, the DC stepper motor stator coils 1210, 1211 and the bi-directional anti-backlash and position locking solenoid coil 1204 are in the de-energized state 1300. When the aforementioned rail position requires an adjustment, assuming the present position coincides with the position of the DC stepper motor rotor shaft 1207 when its stator coil 1210 is energized, the stator coil 1210 is once again energized, state 1301. Upon energizing the stator coil 1210, the solenoid coil 1204 is energized with a current as depicted by arrows 1205, thereby causing the solenoid plunger 1202 to retract and to unlock the present position by disengaging the plunger 1202 from the teeth of the bevel drive gear 1206, state 1302. Then to affect the necessary adjustment, assuming the position of the next step corresponds to energizing stator coil 1211, a current depicted in FIG. 12 by the arrows 1212 energizes stator coil 1211 while stator coil 1210 is de-energized. This actuates the motion in the rotor shaft 1207 depicted by arrow 1208; the direction of this arrow is arbitrary as implied by the term bi-directional anti-backlash and position locking mechanism. This completes states 1303 and 1304 for this example, though the system permissibly continues to step in this manner through an arbitrary number of stator coils on the DC stepper motor 1209, by reiterating state 1303 for successive coils as necessary to achieve the desired set point position of the rotor shaft for this adjustment. Upon obtaining the desired position, the solenoid coil 1204 is de-energized by interrupting the current depicted by arrows 1205, thereby permitting the solenoid spring 1201 to decompress causing the solenoid plunger 1202 to re-engage the teeth of the drive bevel gear 1206 at the new position, performing the operation of anti-backlash and position locking, state 1305. Since this internal bevel drive gear 1206 is further coupled to plural actuated members through gears 1104, and 1105, and there remains some play in the gears, this results in some motion associated with backlash in the actuated members. But the drive bevel gear 1206 has precision fine enough that this resultant motion in the actuated members is negligible for the overall system response. In the final state 1306, the stator coil 1211 is de-energized and the new position of the actuated member and of the corresponding stator coil is placed in a register, of discrete logic or microprocessor register or memory space, as DC stepper motors are amenable to digital control due to their discrete means of determining rotational displacement. More detail of the higher-level system control will follow in subsequent paragraphs and FIG. 15.

While this means of actuating motion in the rail system presents a novel departure from prior art, this preferred means is purely discussed in an exemplary manner, illustrative, not restrictive, and therefore any deviation from the above specification does not constitute a significant departure beyond the scope of the present invention.

Figure 14:
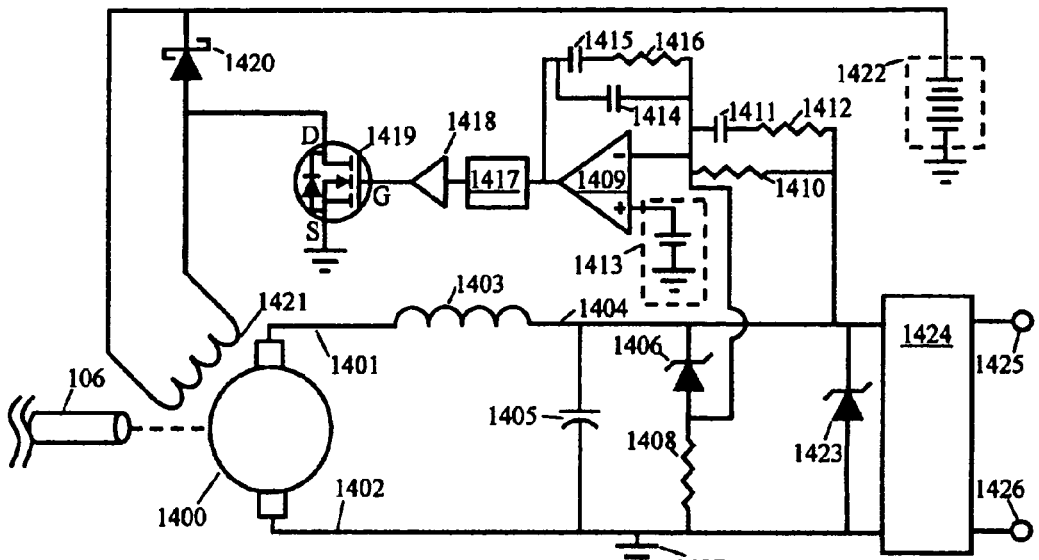
FIG. 14 represents a schematic view of a DC generator directly coupled to the output shaft of the fluid coupler according to one embodiment.

FIG. 14 depicts a coupling configuration and energy extraction means from the impeller through to the output conditioning circuitry of the electric generator. FIG. 14 shows the generator rotor shaft 106 directly coupling to a DC generator 1400. The impeller, not shown in FIG. 14 in order to maintain simplicity, physically occupies the space within the free flowing motive fluid as depicted in FIG. 1 and FIG. 2, while the shaft 106 extends upward into the generator chassis 108. The DC generator 1400 may be any of available forms of DC generator, including but not limited to a commutated or semiconductor-rectified generator, and as shown preferably with a separately-excited or else self-excited shunt field winding 1421 configuration chosen for its combined simplicity and relatively constant voltage independent of load current. The DC generator 1400 thus produces a speed-dependent DC voltage across its armature leads, positive 1401 and negative 1402, that feeds the power filtering elements, the inductor 1403 and the capacitor 1405. Though two armature leads 1401, 1402 imply a single-phase machine, this is purely exemplary, and no predetermination is placed on the number of phases of the machine in the preferred embodiment. The filtering performed by the inductor 1403 and the capacitor 1405 minimizes spurs in the electrical waveform caused by commutation. The preferred embodiment of this invention samples the filtered DC waveform at point 1404 filtered by inductor 1403 and capacitor 1405 referencing the negative armature lead 1402 to local ground 1407 to form feedback that controls the average current through the field winding 1421 and thus controlling the torque opposing the impeller rotation and ultimately the armature voltage depending on impeller rotational velocity and load current.

As previously mentioned, this form of feedback regulation allows by design scaling of the mechanical parameters such as orthogonal beam 105 length affecting torque, and the dimensions and area of the impeller or runner blades 102 ultimately affecting the power extractable in a given installation. For power output means that draw a constant load current, this feedback control of field winding current can compensate for variation in the velocity of the free flowing motive fluid to produce a relatively constant armature voltage and respond accordingly to changes in the free flowing motive fluid that impart varying levels of torque on the impeller, to avert potentially fatigue-inducing torque on the impeller during extreme conditions. For instance, when the average voltage of the sampled, filtered DC waveform 1404 exceeds a given threshold, the feedback control will reduce the average current passing through the field coil 1421 which in turn, reduces the torque on the impeller while reducing the average armature voltage. Likewise, when the average voltage of the sampled, filtered DC waveform 1404 recedes below a given threshold, the feedback control increases the average current passing through the field coil 1421, which in turn, increases the torque on the impeller for the benefit of increasing the average armature voltage. While load or armature current, i.e. the electrical current leaving the filtered node 1404 and entering the output power conditioning means 1424 may vary, responding to load current change may take a subordinate priority compared to responding to changes in free flowing motive fluid in order to avert fatigue on the impeller. In one case, an increase in energy within the free flowing motive fluid coincides with an increase in demand for load current, therefore necessitating little change in average current passing through the field coil 1421. Similarly, a decrease in energy within the free flowing motive fluid coincides satisfactorily with a decrease in demand for load current again necessitating little change in average current drawn through the field coil 1421. However, given the energy within the free flowing motive fluid increases or decreases contrary to a decrease or increase in demand for load current, these situations can elicit limitations in the control loop response. These limitations may manifest in terms of delayed response time, that is, control loop parameters such as loop bandwidth and damping factor that primarily concern stability may slow a response time, producing inadequate transient output voltage or else excessive transient output voltage given a lesser bandwidth or incorrect damping factor. Also the design must take into careful consideration the overall headroom for meeting system demands during such instances, and thus varying loads require more design complexity. Therefore the preferred embodiment of this invention powers output means drawing constant current for optimal power conditioning for application to loads as described in subsequent paragraphs.

Proceeding further along the path of the feedback loop, FIG. 14 depicts two points on the filtered node 1404 where sampling occurs. The path including the resistors 1410, 1412 and the capacitor 1411 constitute the voltage sampling node of a typical feedback loop with frequency compensation. The network of these resistors 1410, 1412 and the capacitor 1411 along with the error amplifier 1409 and its own feedback loop represented by the capacitors 1414, 1415 and the resistor 1416 form the feedback section of prior art switch mode power supply design. Given the fixed internal reference voltage 1413 into the non-inverting input of the error amplifier 1409, resistor 1410 along with resistor 1408 compose a voltage divider that sets the optimal voltage on the filtered node 1404 that feeds the output power conditioning means 1424 while this control loop responds to variations in the velocity of the free flowing motive fluid. The reference voltage 1413 multiplied by the quantity of one plus the ratio of resistor 1410 over resistor 1408 determines the optimal value of the output voltage of the filtered node 1404 that the control loop maintains despite changes in input energy. The other sampling point includes the Zener diode 1406 that quickens the response to over-voltage conditions at the sampling point 1404. Resistor 1408 must be of correct value in order to allow the Zener current to flow through the diode 1406 given this over-voltage condition. The design of the frequency compensation of this error amplifier must also take into account the junction capacitance, though often negligibly small, seen across the Zener diode 1406 and parallel to resistor 1410. Resistors 1412 and 1416 and capacitors 1411, 1414, 1415 form the frequency compensation of the error amplifier 1409 within the feedback loop of the traditional switch mode power supply. While tuning these frequency compensation components is not germane to the specification of the present invention and is elsewhere covered in greater detail, this specification will now disclose some general observations regarding it. Uncompensated, the filter components, the inductor 1403 and the capacitor 1405 produce a complex pole pair at their resonant frequency given by one over the quantity of two times pi times the square root of inductance times the capacitance. The filter capacitor 1405 also places a zero above the pair of poles at a frequency given by one over the quantity of two times pi times the capacitance and the value of the capacitor's 1405 equivalent series resistance, "ESR". Generally as a goal in compensation, two zeroes are added near the filter resonant frequency to correct the sharp change in phase near that frequency and an open-loop unity gain frequency is chosen to exist at a frequency about ten times greater than the resonant frequency but less than about 10% of the switching frequency. The overall gain of the error amplifier 1409, the filter components comprising the inductor 1403 and capacitor 1405, the two zeroes added plus the gain of the integrator created by the compensation network that sets open-loop unity gain frequency preferably sums to zero at the unity gain frequency. The integrator gain is given by 1/(2(pi)(Fo) (R1410(C1414+C1415))) where Fo is the open-loop unity gain frequency. The frequency of the output filter compensating zeroes equals 1/(2(pi)(R1416)(C1415)) and 1/(2(pi) (R1410+R1412)(C1411)) and these zeroes are understood to add to 40 dB per decade of gain. A pole also exists in the compensation network and its frequency is chosen to coincide with the zero formed by the output capacitor 1405 and its equivalent series resistance "ESR". This compensating pole frequency equals 1/(2(pi)(R1412)(C1411)). A final pole in the compensation network exists at the frequency 1/(2 (pi)(R1416)(C1414∥C1415)) and is selected to be about ¾ Fs, three-quarters of the switching frequency to reduce switching noise into the error amplifier 1409. While it is understood the precise placement of the pole frequencies, integrator frequency and zeroes frequencies is not of utmost criticality, care must still be taken to follow the aforementioned feedback loop frequency compensation practices to yield best power supply response and stability, and particularly a relatively constant output voltage 1404 over the widely varying angular velocity of the rotor 106 resulting from the wide variation of energy within the free flowing motive fluid. In the past, stability problems have risen due to a negative resistance oscillator formed by cascading switch mode power supplies. For example, the second switch mode power supply in FIG. 14, the output power conditioning means 1424, presents a negative resistance because its input current actually decreases with increased input voltage, which in turn may cause instability by adding right-hand s-plane poles in the characteristic equation of the control loop. To prevent this form of instability, the design must ensure the magnitude of the complex impedance of the source, i.e. the DC generator 1400 along with the power filtering elements, the inductor 1403 and the capacitor 1405, is much less than the magnitude of the input impedance of the output power conditioning means 1424 over the entire frequency band of interest, from DC to the unity gain frequency of the feedback loop of the output conditioning means 1424. Careful consideration to all the aforementioned stability criteria ensures long-term reliability and optimal energy extraction from any given installation.

Proceeding further along the feedback path depicted in FIG. 14, after the error amplifier 1409, a pulse width modulation or pulse frequency modulation controller 1417 exists primarily to convert the analog error signal output of the error amplifier 1409 into pulses which, after getting conditioned to source and sink large impulses of current by the gate driver buffer 1418, drive the gate of the field coil current switching field effect transistor 1419, ultimately determining the average current drawn through the field winding 1421 of the DC generator 1400. The design of the pulse width modulation or pulse frequency modulation controller 1417 preferably implements an analog comparator, not shown, that sets and resets logic according to the value of the sampled voltage 1404 compared to a fixed reference. In this case the analog comparator, not shown within block 1417, receives at its inverting input, the voltage signal output from the error amplifier 1409. The non-inverting input of the analog comparator, not shown, receives a DC voltage signal equal to that of the voltage reference 1413, in the same manner as the error amplifier 1409. Thus the analog comparator within the pulse width modulation or pulse frequency modulation controller 1417 compares the inverted output of the error amplifier 1409 to a voltage equal to DC reference 1413. Since the comparator within the pulse width modulation or pulse frequency modulation controller 1417 itself is also configured as an inverting amplifier referenced to the voltage reference 1413, the filtered output voltage 1404 once divided by resistors 1410, 1408 gets inverted through the error amplifier 1409, and its output gets inverted by the comparator within the pulse width modulation or pulse frequency modulation controller 1417, thus the comparator output is a logic high signal when the filtered output voltage 1404 is above the set voltage and the comparator output within the pulse width modulation or pulse frequency modulation controller 1417 is a logic low signal when the filtered output voltage 1404 is below the set voltage. This comparator output logic signal is routed out through logic means that finally inverts the signal into the gate driver 1418. Thus when the filtered output voltage 1404 exceeds the set voltage, the logic means resets and along with the output of the modulation controller 1417 and inputs to the gate driver 1418, goes low, disabling current flow through the field coil current switching transistor 1419. The logic means within the pulse width modulation or pulse frequency modulation controller 1417 preferably permits the controller 1417 to operate in an energy saving "pulse skip" mode. When the output voltage 1404 exceeds the set voltage, skipping pulses saves the energy needed to charge and discharge the gate of the field coil current switching transistor 1419. Let it hereafter be known that this means of controlling the average field coil current using switch mode techniques is strictly exemplary and not restrictive, and therefore any changes in configuration, such as but not limited to, choice of pulse width versus pulse frequency modulation, or the polarity of the output logic and according choice of N-type or P-type channel material of the field coil current switching transistor 1419, does not constitute a substantial departure beyond the scope and spirit of the present invention.

While FIG. 14 depicts a separately excited field coil as the means of field coil excitation, a self-excited shunt field winding likely proves equally effective, if not more readily realizable due to the amount of current passing through the coil and convenience of not needing the physical space a separate supply 1422 occupies. Note that while FIG. 14 also depicts the catch rectifier 1420 as a Schottky diode, that a synchronized switching transistor may be implemented in its place at the expense of greater complexity in the logic of the controller 1417 and an additional gate driving buffer similar to gate driver buffer 1418 but for the benefit of increased power efficiency. As well known by those skilled in the art, because the field coil 1421 is inductive, when the current is switched, the field coil voltage is reversed proportional to the inductance multiplied by the change in current with respect to time. Using a simple catch rectifier 1420 can protect the switching transistor 1419 from over voltage while feeding that stored energy back to recharge the separately excited field winding source 1422 or back into the armature terminal 1401 in the case of a self-excited shunt field winding, thereby returning the stored energy in the field coil 1421 back to the system, increasing the system power efficiency. A synchronous switching rectifier that has a lower voltage drop across it depending upon drain to source on-resistance and rectifying current compared to the catch rectifier 1420 gains further efficiency. The complexity of the synchronous rectifier lies in the precision required to prevent the field coil current switching transistor 1419 including its gate capacitance from having an on-time that coincides with the on-time of the transistor including its gate capacitance that replaces the catch diode 1420. Having on-times that coincide effectively short-circuits the field winding leads and thus short-circuits the field winding excitation source. Conversely, the longer delay in turning-on the synchronous rectifying transistor reduces the gain in efficiency. Digital timing circuitry within the controller 1417 may achieve the goal of precise timing necessary, given a known tolerance for the gate capacitances of the switching transistors. Whether the system of controlling average field coil current implements a simple catch diode or a synchronous rectification circuit, both circuits remain within the scope of the present invention.

While this specification previously presented a chopped field coil current controlled DC generator as the preferred embodiment, equivalent generator configurations exist within the scope of the present invention. In one embodiment, the generator 1400 alternatively exists as an AC induction generator of adequate number of poles such that its synchronous speed, which determines whether the AC machine is operating in its generator or motor region according to its torque-slip curve and is inversely proportional to the number of poles, is well below the average rotational velocity of the rotor 106 and therefore the AC machine operates with positive slip as a generator. As previously mentioned the rotational velocity of the rotor is directly proportional to the ratio of the velocity of the motive fluid approaching the impeller to the length of its moment arm, and thus also affects the calculation of the required synchronous speed of the AC induction generator in an alternate embodiment. What makes the AC induction generator desirable is its economical, reliable construction and widespread use, rendering this type of generator easily attainable and cost effective. Also, asynchronous AC induction generation requires little additional circuitry in order to apply power directly to the utility power grid. In the case of unavailability of an AC induction generator of sufficient number of poles for an adequately low synchronous speed to operate with positive slip given the average rotational velocity of the rotor 106, the AC induction generator indirectly couples to the impeller through a gear system. This gear system increases the rotational velocity of the rotor shaft 106 with respect to the impeller. The gear system likely occupies space within the generator chassis 108 in proximity to the generator 1400. In order to directly apply the voltage from the AC induction generator to the utility power grid through wires 1425, 1426, the electrical circuit represented by output conditioning means 1424 contains a speed dependent switch that receives an input signal from a velocity transducer sensing the rotation of the rotor 106 in the generator chassis 108. The velocity transducer output signal therefore also needs to physically traverse the same path as the leads 1401, 1402 either on its own conductor or modulated upon the armature coil power current. This speed dependent switch affords highest efficiency and protection such as when the coupler shaft has inadequate velocity for positive slip, or there exists a fault condition on either side of the output conditioning means 1424, the AC generator becomes disconnected from the utility power grid. This gear system including automatic transmission to change the impeller to rotor gear ratio to achieve constant output voltage amplitude over varying fluid velocities, rotational velocity transducer, and speed dependent switch effectively replaces the filtering components 1403, 1405, and the entire field current controlling feedback loop of the previously described DC generator system. The output conditioning means 1424 is likely physically located on land away from the generator unit, with the leads 1401, 1402, routed from the generator 1400, down through the support structure 109, 110 to the base 111, out along the rail system 114 to the onshore location of the output conditioning means 1424. As with the leads before the output conditioning means 1424, though only a pair of wires 1425, 1426 are shown implying a single-phase system, this is purely exemplary with no predetermination of the number of phases that may be applied to the utility power grid.

Returning to the DC generator implementation, a variety of loads may be applied by connection to the leads 1402, 1404 depending upon end user needs. Examples of loads include charging any variety of available chemistries of battery; the leads 1425 and 1426 themselves terminating as the electrodes in the process of electrolysis of water to produce hydrogen fuel; or the leads 1425 and 1426 further powering a DC motor coupled to a synchronous AC generator directly applied to the utility power grid. In all three cases here, the output means 1424 will likely require the protection of the transient voltage suppressor 1423, shown in FIG. 14 as a Zener diode, from inductive spikes caused by commutation. Here in these examples of output loads as in all foregoing descriptions, the local ground 1407 attached to lead 1402 purely references the negative differential voltage output of the generator 1400 and all other associated references in the field coil current controlling feedback system, not ordinarily referenced to true earth ground and thus not the chassis ground potential of the generator chassis 108 and for that matter, quite likely completely isolated from the negative differential voltage lead 1426 from the output power conditioning means 1424 which may or may not be referenced to a true earth ground potential.

In the case of the load being the charging batteries, the output conditioning means 1424 occupies the physical location of the generator chassis 108, but because the process of battery charging generally requires low-error voltage sensing at the battery terminals and low-error temperature sensing from a thermistor within the cell packaging powered by an accurate reference, the design more feasibly and economically locates the charger section of the output power conditioning means 1424 in proximity of the battery unit charging on shore. Therefore the leads 1425, 1426 route high voltage DC power from the output power conditioning means 1424, down through the support structure 109, 110 to the base 111, out along the rail system 114 to the onshore location of the battery and associated charger.

In the preferred embodiment, the load is the current required to perform electrolysis on water to produce hydrogen fuel. This process achieves a high efficiency due to inherent advantages in the preferred embodiment of the present invention. Seawater is naturally electrolytic thereby reducing chemical processing costs; and advanced electrolysis methods allow for a voltage as little as one and a half to two volts applied across the electrodes, which the generator 1400 in the self-excited shunt field winding configuration can easily provide over a wide range of rotational velocities of the rotor 106. Given the requirements for such a system for electrolysis, the output conditioning means 1424 in one case consists of simply a very high efficiency synchronous switch mode buck or in other words, step-down DC-to-DC converter, with some form of current regulation, to provide the appropriate voltage to the electrodes 1425, 1426 to perform electrolysis. In this case, synchronous switch-mode DC-DC conversion cannot provide isolation of the local ground 1407 from true earth ground, which may or may not be tolerable for the configuration of DC generator 1400 implemented, though desirable due to its simplicity and optimal efficiency. If the DC generator 1400 absolutely requires ground isolation, then a flyback or forward DC-DC converter with synchronous rectification within the output power conditioning means 1424 achieves the next highest efficiency. Because this output power conditioning means 1424 is relatively simple and compact, it can occupy an area adjacent to the generator 1400 within the generator chassis 108, with the leads 1425, 1426 routing conditioned DC power to the electrodes contained within the appropriate sections of an electrolyzer closer to shore. The system preferably reduces wire losses by routing a high voltage and lower current to the electrolyzer where the power is then regulated to a lower voltage and higher current. The electrolyzer thus stores the produced hydrogen fuel in the vicinity of the electrolyzer, generated through electrolysis of seawater admitted into the appropriate section of the electrolyzer in a controlled manner. The leads 1425, 1426 terminate as the electrodes, particularly the anode and cathode, respectively, for the electrolyzer, and thus the anode 1425 references to true earth ground as the hydrogen collects at the cathode 1426 while the system isolates both the gas and electrical potential at the cathode 1426 from the surrounding environment. One means of using seawater for hydrogen electrolysis consists of admitting seawater through a filter membrane in a reverse osmosis process for desalination then adding potassium hydroxide as an electrolyte for increased electrolyzer efficiency. In the preferred means, the filter membrane is coarse enough to allow seawater with salt less the silica particulate, and the anode 1425 is plated with manganese dioxide to minimize the amount of sodium hypochloride, NaOCl, also known as sodium chloroxide or bleach that collects at the anode 1425. This preferred electrolysis method saves the cost in energy to perform reverse osmosis desalination and processing the sodium chloroxide by-product otherwise an environmental contaminant.

A third exemplary load for the DC generator 1400 exists in the form of the leads 1425, 1426 attached to a DC motor further coupled to an AC synchronous generator directly applied to the utility power grid. In consideration of this application, the input circuitry of the DC motor necessarily not only requires voltage regulation to maintain constant speed in the DC motor coupled to the synchronous AC generator, but further requires high capacity charge storage devices in the form of a very large capacitor or bank of capacitors or possibly a battery, also in order to maintain constant speed in the DC motor coupled to the synchronous AC generator during periods of reduced rotational velocity in the rotor 106. The complexity and physical volume of this DC motor input circuitry requires its location in close proximity of the DC motor and AC synchronous generator. As such, the leads 1425, 1426 route high voltage DC power from the output power conditioning means 1424 down through the support structure 109, 110 to the base 111, out along the rail system 114 to the onshore location of the DC motor and AC synchronous generator.

Alternately, the output power conditioning means 1424 may take the AC voltage produced by an AC induction generator in place of the DC generator 1400 from leads 1401, 1402 and full-wave rectify the AC voltage into a DC voltage, then filter and further regulate the voltage and current for optimal power conditioning for application to loads as described in the foregoing paragraphs regarding DC power generation.

Figure 15:
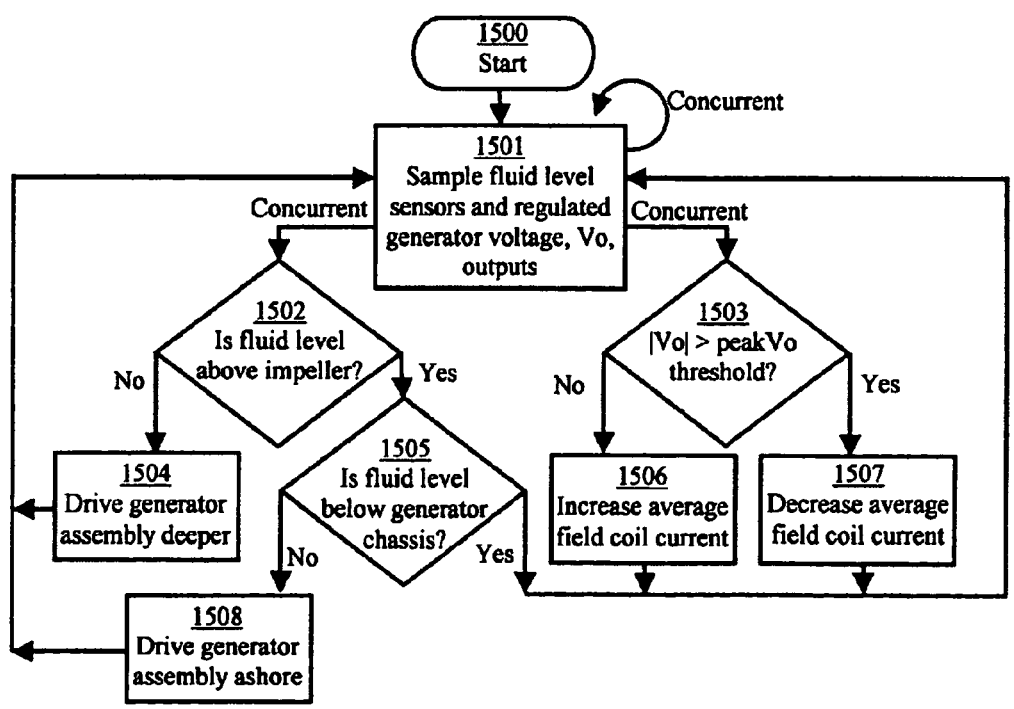
FIG. 15 illustrates the flowchart for control of the complete system according to the preferred embodiment of the present invention.

FIG. 15 illustrates the overall control of all the components described thus far of the complete transverse hydroelectric generator for adaptively extracting energy from a free flowing motive fluid that continuously changes direction and magnitude of flow. While FIG. 15 displays a flowchart, which is ordinarily associated with a computer program running in software, the algorithm delineated may be implemented with any combination of hardware or software such as linear or analog circuits or discrete digital circuits or an integrated central processing unit, or a microprocessor. A central processing unit or microprocessor affords the advantage of convenient means to gauge, test, and communicate to a central service logging location the state of any part of the system, including functionality, or fullness of charge of batteries, or hydrogen fuel tanks, etc., using means such as well-defined existing serial protocols or wireless standards. From the start 1500, the controller is continuously sampling and storing 1501 such variables as the main generator output voltage, denoted Vo, and the output from fluid level sensors positioned at two different heights along the vertical support struts 110, one level positioned just above the impeller and the other level positioned just below the generator chassis 108. An almanac of tidal depths or position of waves breaking relative to the generator unit stored in read-only memory represents an alternative or augmentation to the aforementioned fluid level sensors. From the sampling and storing 1501 process the system control algorithm proceeds in two concurrent paths through the remainder of the flowchart. While not specifically stated in block 1501, it may be assumed all sampled variables including the signals representing the fluid level and the generator voltage Vo are sampled and stored in a likewise continuous, concurrent manner as implied by the looping arrow exiting only to return to the upper right corner of block 1501. In the preferred embodiment, the period for sampling the fluid levels has a time resolution necessary to react to and control mechanical processes, ordinarily sampling at an approximate frequency of about a hundred times a second, or a period of about ten milliseconds, with a small deviation allowable possibly due to the convenience of a local non-integer multiple frequency digital clock from which to derive this sampling clock frequency. This algorithm then averages the samples over a space of five to ten samples, this average representing a single sample in order to reduce the effects of noise. It is reasonable that the processes depicted by blocks 1502, 1504, 1505 and 1508 or in other words fluid depth adjustments need to occur, or most efficiently occur for that matter, no more often than ten to twenty times a second. The fluid level comparison blocks 1502, 1505 determine from the fluid sensor samples, or else from tidal information stored in computer memory, whether the entire generator unit occupies a position in the motive fluid of adequate depth to fully utilize the impeller area while not occupying a motive fluid depth that impinges the generator chassis 108 causing undue stress and possibly fatigue to the support structure. From this first fluid level comparison block 1502, the algorithm then either drives the entire unit along the aforementioned rail system out deeper into the motive fluid as depicted by the increase depth process 1504, or then determines from the sensors just below the generator chassis 108 in the second fluid level comparison block 1505 if the fluid level is of too great a height and risks damaging the support structure and therefore must drive the unit ashore 1508. The means to implement the depth adjustment processes 1504, 1508 have been algorithmically delineated in the preceding paragraph describing FIG. 13. Note that the two concurrent paths through the flowchart of FIG. 15 as well as some of the processes undergone in those paths are implementation specific. Obviously if certain hardware components were omitted, that then renders the associated process obsolete. For instance, if a given installation foregoes implementing the entire rail system based on replacing the support structure and associated downtime costing less than implementing the rail system, the design may omit this entire path through the flowchart.

In practically all conceivable embodiments, there always exists the path that serves to adjust the field coil current to optimize the generator output voltage, Vo, while minimizing the necessary torque exerted on the impeller over a range of velocities of the free flowing motive fluid. Thus in the flowchart of FIG. 15, the path proceeds from the sampling block 1501 to the decision block 1503, where the instantaneous magnitude of the sampled main generator output voltage, |Vo|, is compared to an upper threshold. This upper threshold likely equals in excess of one hundred percent of, but less than two times, the rated voltage of the generator. Various types of circuits may perform this comparison through either digital sampling followed by numeric comparison or through analog means to control the average field coil current such as the control feedback loop previously described with FIG. 14. Hence, the outcome of this comparison in block 1503 determines whether to increase 1506, or decrease 1507, the average field current accordingly. Using means described previously and depicted algorithmically in FIG. 15, this path exists to process the sampled instantaneous magnitude of the output voltage |Vo| to determine the average field coil exciting current by means of feedback control processes applied in order to optimally extract energy from a free flowing motive fluid. If implemented digitally, the number of samples per second corresponding appropriately to slightly greater than two times the unity gain loop bandwidth previously described, defines the sampling period per the Nyquist criterion. This digital algorithm, like the preceding analog circuitry, allows the generator to produce a maximum voltage while mitigating the risk of fatigue upon the impeller throughout the extremes of usable flow.

The previously described paths through the flowchart of FIG. 15 perform mathematical manipulations on sampled output voltages of sensors in order to determine the appropriate course of action. It shall be known that any of the paths could share the outputs of these mathematical functions in order to improve the overall control algorithm. While not explicitly depicted for sake of clarity in the flow diagram of FIG. 15, it may be inferred, and thus any deviation of the algorithm to include the additional use of these function output variables in decision blocks, or for that matter, use of a singular central processor to also concurrently perform these and other control tasks not explicitly depicted, such as, but not limited to: charging batteries; or performing electrolysis; or electronic means of motor speed control; adjusting to changes in load; or stepper displacement; or controlling an array of similar transverse generators; or logging communications; does not constitute a substantial departure beyond the scope of the present invention.

From the detailed description above it is manifest that various implementations can use the concepts of the present invention without departing from its scope. Moreover, while the invention has been described with specific reference to certain embodiments, a person of ordinary skill in the art would recognize that significant alterations could be made in form and detail without departing from the spirit and the scope of the invention. The described embodiments are to be considered in all respects as illustrative and not restrictive. It shall also be understood that the invention is not limited to the particular embodiments described herein, but is capable of many rearrangements, modifications, omissions, and substitutions without departing from the scope of the invention.

Thus, a transverse hydroelectric generator for adaptively extracting energy from a free flowing motive fluid that continuously changes direction and magnitude of flow has been described.

What is claimed is:

1. An apparatus of power generation having an impeller which responds to a free flowing motive fluid flowing transverse to the rotor of said apparatus wherein:

said impeller mechanically or electro-mechanically or electronically instantaneously adjusts its response to the varying kinetic energy contained in said motive fluid by means of converting said varying kinetic energy to electrical potential for feedback control of withstanding torque on said impeller to avert fatigue on said impeller, said feedback control scales said electrical potential to produce constant voltage for a constant load such as an electrolyzer or a charging battery while simultaneously limiting said withstanding torque to avert fatigue on said impeller over said varying kinetic energy levels of said motive fluid, said electrical potential is scaled within a DC generator by controlling the average field coil excitation current determined by voltage feedback from across the armature winding.

2. The apparatus of claim 1 wherein said free flowing motive fluid is seawater, said seawater is affected by natural or man-made rises in elevation of the ocean floor or any other constriction of the free flow, said elevation or constriction breaks oceanic wave motion such that the wave or tidal energy is transferred into accelerating the water itself, said generator extracts energy from the force of said accelerated water.

3. The apparatus of claim 1 wherein said motive fluid is a free flowing body of water in any form including but not limited to rivers, creeks, inlets, tidal bores, rapids, or waterfalls.

4. The apparatus of claim 1 wherein:

said impeller is submerged within the motive fluid, said generator is not submerged within the motive fluid.

5. The apparatus of claim 1 wherein said impeller has a hinge which closes to reduce the runner blade surface area thus reducing drag when the impeller rotates into the direction of said free flowing motive fluid.

6. The apparatus of claim 5 wherein said hinged runner blade has a cupped profile that enables extraction of both impulse force of the impinging motive fluid and reaction force after the motive fluid flows along the surface of said runner blade.

7. The apparatus of claim 1 wherein said impeller has a conic shape with a curvature to change both direction and magnitude of the velocity of flow as it impinges the impeller internal surface enabling extraction of both impulse and reaction forces from said motive fluid.

8. The apparatus of claim 7 wherein said impeller curvature directs said flow towards barrages along the trajectory of the impeller to increase trust.

9. The apparatus of claim 1 wherein said generator system is mounted to a short rail system so that the location of the apparatus can be adaptively located to an optimal location such as the onshore side of the breaking waves, or the location of highest velocity flow in any body of water.

10. The apparatus of claim 9 wherein said location of the apparatus along said rail system is determined by a means of sensing the depth of said apparatus using fluid level sensors mounted at varying heights within the support structure of said apparatus.

11. The apparatus of claim 9 wherein said location of the apparatus along said rail system is determined by an electronic microprocessor system with an almanac in memory indicating tide level and/or relative mean location of the breaking waves with respect to the rail at any given time.

12. The apparatus of claim 9 wherein adjustment of location of the apparatus along said rail system is performed by:

means of a singular DC stepper motor with rotor output shaft affixed to, or forged or cast into a beveled pinion, said beveled pinion meshes with a bi-directional anti-backlash and position locking mechanism propelled by a spring loaded solenoid operating synchronously to said DC stepper motor, said beveled pinion synchronously meshing to a gear driving an axel which in turn drives a gear that meshes to a rack gear mounted on said rails.

13. The apparatus of claim 1 wherein said average field coil excitation current is controlled using means of switch mode current control.

14. The apparatus of claim 1 wherein said voltage feedback control system is implemented using means of digital sampling techniques.

15. The apparatus of claim 1 wherein said charging of a battery, including gauging and communicating the fullness of the battery is controlled by an electronic microprocessor.

16. The apparatus of claim 1 wherein said process of electrolysis of water to produce hydrogen fuel, including gauging and communicating the fullness of the output gas tanks is controlled by an electronic microprocessor.

17. The apparatus of claim 16 wherein said hydrogen electrolyzer has an anode or a plurality of anodes comprising manganese dioxide plating in order to reduce the formation of sodium chloroxide by-product.

* * * * *